June 18, 1940.    E. J. BEACH    2,205,336

OIL AND WATER SEPARATOR

Filed Dec. 13, 1938

WITNESSES
Geo. W. Naylor
A. L. Kitchin.

INVENTOR
Edward J. Beach
BY
Munn, Anderson & Liddy
ATTORNEYS

Patented June 18, 1940

2,205,336

UNITED STATES PATENT OFFICE 2,205,336

OIL AND WATER SEPARATOR

Edward J. Beach, Brooklyn, N. Y., assignor to Beach-Russ Company, New York, N. Y., a corporation of New York Application December 13, 1938, Serial No. 245,378

1 Claim. (Cl. 210—51)

This invention relates to an improved oil and water separator, and has for an object to provide a construction wherein the dirt and water carried thereby may be removed without disturbing the oil in the separator.

Another object of the invention is to provide an oil, water and air separator, wherein the oil and water laden air is discharged in a given manner and the oil and water separated from the air and later the water and oil separated so that they may be removed from the separator and at different points.

A further object, more specifically, is to provide an oil, water and air separator wherein the air is allowed to escape in one direction and the oil in another, the water passing to a sump and pipe extending into the sump.

In the accompanying drawing—

Figure 1:
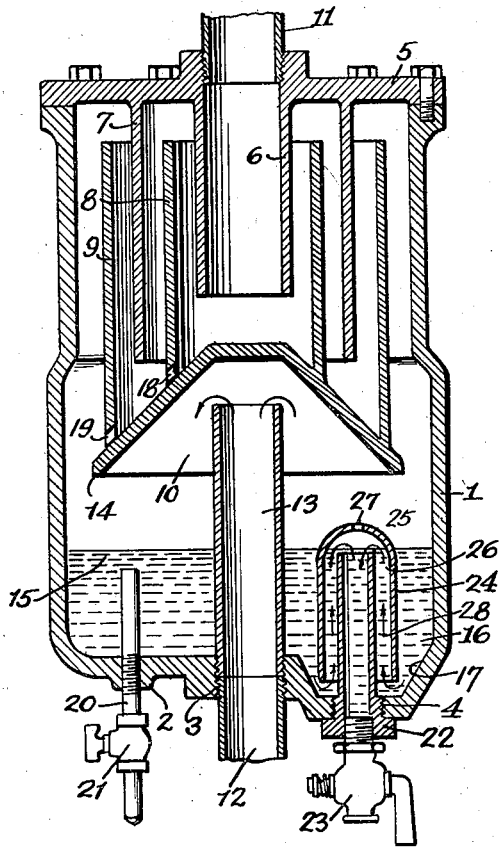
Fig. 1 is a longitudinal vertical sectional view through a separator disclosing an embodiment of the invention.

Referring to the accompanying drawing by numerals, 1 indicates the casing of the separator which is open at the upper end and at the lower end is provided with apertures 2, 3 and 4. A cap 5 is connected to the open end of the casing 1. This cap, is provided with the inner and outer depending tubular members 6 and 7 coacting with the inner and outer tubular members 8 and 9 of an inverted cone 10. The tubular member 6 is open to the atmosphere and a pipe 11 may be connected therewith for leading the air to any desired point.

In operation, water, oil, air and possibly some dirt or other foreign matter, are discharged through the pipe 12 threaded in opening 3 and this matter passes through the inlet pipe 13 and usually strikes the under surface of cone 10. This deflects the air, oil and water, and usually the oil, water and dirt move downwardly and drop off the lower edge 14 of the cone so as to provide a level of oil and water in the bottom of the casing 1. Usually the upper part or portion 15 is oil while the lower part 16 is water and dirt. This water and dirt gravitates to a sump 17. The air passing the edge 14 will pass upwardly around the outside of the tubular member 9 and then downwardly and between the tubular members 7 and 8 in an upward direction and again downwardly through tubular members 6 and 8, the air finally passing out through the tubular member 6. As the oil and air change directions in the manner just described, oil will be deposited on the various tubular members and will gravitate downwardly and finally flow out through the various openings 18 and 19 so as to drip off edge 14. If there should be any water in the air the water will move with the oil. In pumps and other devices pumping air, oil is usually provided for lubrication. Consequently, some of the oil can mix with the air. Occasionally water in small quantities is also mixed with the air and this mixture with any dirt is discharged against the bottom of the cone 10 and eventually the air passes out through the pipe 11 and the remaining material passes downwardly into the bottom of the casing 1. An oil discharge or lead-out pipe 20 is fitted into the aperture 2 and extends upwardly to near the top of the oil level 15 so that whenever the valve 21 is opened substantially clean oil will be drawn from the casing.

As heretofore mentioned, the water and dirt or other foreign matter will gravitate to a position in the sump 17. This sump is provided with an opening 4 through which a pipe 22 extends. This pipe extends to the top of the liquid level in the casing, or almost to the top. In fact, the height of the pipe 22 determines the level of liquid in the casing as when the level exceeds the top of pipe 22 it flows over and into this pipe when the valve 23 is open. Ordinarily this valve is left open at all times so that the level of the liquid in the casing 1 will never exceed that illustrated in Fig. 1 of the drawing. An inverted hood 24, or rather a tubular hood open at the bottom, is placed over the pipe 22 so as to be spaced therefrom at all points and having its upper end 25 spaced above the upper end of pipe 22. Suitable arms or a spider structure 26 is preferably used to support the hood 24 on the pipe 22. A vent aperture 27 is provided in the end 25 so as to prevent siphoning of the liquid from the casing 1.

As the oil, dirt, and other foreign matter gravitate to the sump 17 and as new oil is deposited in the casing during the operation of the device, the water and foreign matter in the sump 17 will be forced upwardly into the annular channel or space 28 and will be caused to flow over the top of pipe 22 whenever the valve 23 is open. In actual operation the valve 23 is left open at all times, as well as valve 21 which is interposed in pipe 20. Pipe 20 extends down to the bearings of the pump (not shown) so that oil from the casing 1 may be forced under the action of gravity into the bearings and eventually this oil will be forced upwardly through pipe 12 and be again deposited in casing 1.

Figure 2:
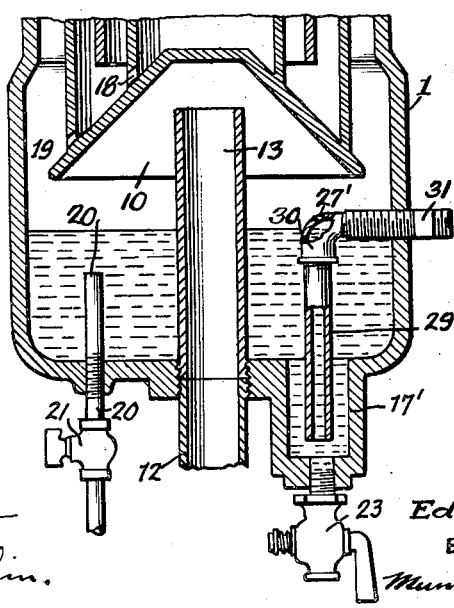
Fig. 2 is a view similar to Fig. 1 but showing a modified form of the invention and with the upper part broken away.

In Fig. 2 a slightly modified construction is disclosed wherein all the parts are similar to those shown in Fig. 1 and are given the same reference numerals. It will therefore be seen that the casing 1 is provided with a rather deep sump 17'. An outlet valve 23 is provided which opens directly into the bottom of the sump. However, ordinarily the sump is not drained through valve 23 but through a pipe 29 which extends downwardly into the sump to near the bottom thereof. This pipe is provided with an elbow 30 connected with an outlet pipe 31, and an air vent 27' is provided in the elbow 30 whereby siphoning will be prevented. However, as the liquid level rises in the casing 1, water or foreign matter will pass downwardly into the sump 17' and then upwardly through pipe 29 and finally out pipe 31. This action is continuous during the operation of the device.

I claim:

A device of the character described including a casing adapted to have oil and water discharged therein, said casing having a tubular lower portion provided with a substantially flat bottom formed with a depressed sump at one side, said sump having a threaded aperture in the bottom, a pipe screwed through said threaded aperture extending exteriorly of said casing and upwardly through said sump to a point appreciably above the sump and the bottom of said tubular lower portion, an inverted cup-shaped hood positioned over said pipe having its lower end extending to near the lower part of the sump, said hood being spaced from said pipe at all points so that as the liquid in the casing rises that part in the sump will be forced upwardly between the pipe and hood and finally over the upper end of the pipe so as to be led to the discharge point, and a hand-actuated valve screwed on to that part of said pipe projecting outside of said casing for regulating the discharge through said pipe.

EDWARD J. BEACH.